Nov. 26, 1963     C. SALOMONSON     3,112,135

HANDY EXTENDING GRIP

Filed April 3, 1961

INVENTOR.

CONRAD SALOMONSON

3,112,135
HANDY EXTENDING GRIP
Conrad Salomonson, Brooklyn, N.Y.
(58—53 80th St., Elmhurst 73, N.Y.)
Filed Apr. 3, 1961, Ser. No. 100,426
1 Claim. (Cl. 294—16)

This invention relates to gripping devices and more particularly to a manually operated gripping device.

It is an object of the present invention to provide an extensible gripping device which can be conveniently operated from a remote location for performing various tasks.

A further object of the present invention is to provide a manually operated extensible gripping device having a remotely controlled gripping means at one end for grasping a remote object for any desired purpose.

Other objects of the invention are to provide an extendable gripping device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
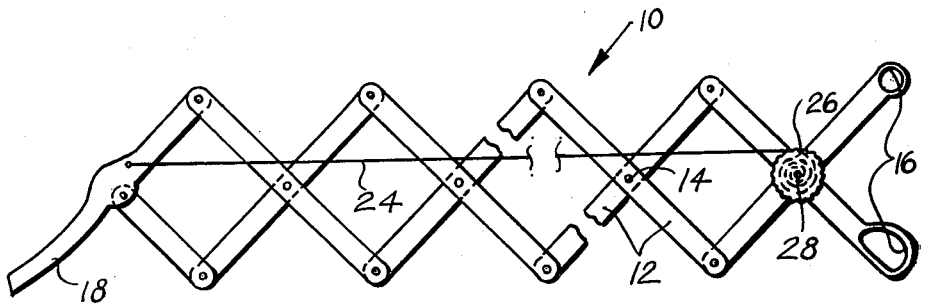
FIGURE 1 is a side elevational view of an extensible gripping device made in accordance with the present invention in an extended position.
Figure 4:
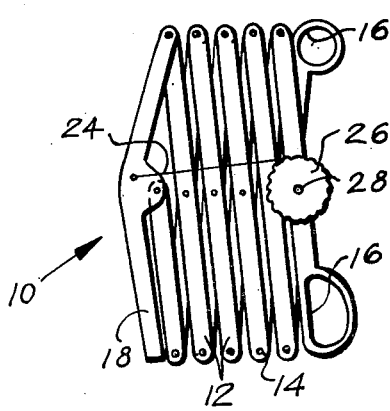
FIGURE 4 is a side elevational view of the device shown in FIGURE 1 in a retracted position.

Referring now more in detail to the drawing, an extendable gripping device 10 made in accordance with the present invention is shown to include an expandable link assembly consisting of a plurality of pivotally connected links 12 each centrally pivoted by means of hinge pins 14 to each other to provide for parallelogram type movement between a retracted position, as shown in FIGURE 4 and an extended position as shown in FIGURE 1.

One end of the link assembly is provided with a pair of links having finger receiving openings 16 for manual actuation thereof. The opposite end of the link assembly is provided with an extension 18 having a clamping member 20 pivotally supported upon a side thereof and normally urged toward a closed position by means of a spring 22 acting between the extension 18 and clamping member 20.

Figure 2:
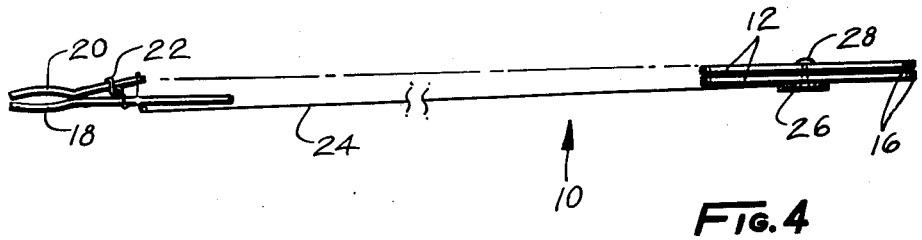
FIGURE 2 is a top plan view of the device shown in FIGURE 1.
Figure 3:
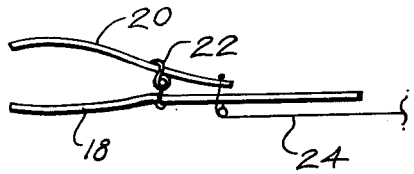
FIGURE 3 is an enlarged fragmentary top plan view of certain parts of the device shown in FIGURE 2, in a release position.

A cable member 24 windingly supported at one end upon a spring operated sheave 26 carried by a hinge pin 28 adjacent to the finger receiving end of the link assembly, is connected at its opposite end to the free end of the clamping element 20. Thus, in response to extension of the link assembly to the fully extended position shown in FIGURE 1, the flexible cable 24 is permitted to open to its full length, so that continued movement of the link assembly therebeyond is operative to cause pulling action upon the free end of the clamp element 20 to effect the opening of the clamp arm 20 relative to the extension 18, to facilitate the insertion of an object therebetween. Upon relaxation of the grip upon the finger receiving opening 16, the spring biased sheave 26 will tend to return the link assembly to the retracted position shown in FIGURE 4 through the cable 24, which will also return the clamp arm 20 to a clamping position with the extension 18, as shown in FIGURE 2, thus automatically gripping the object received between the clamp arm 20 and the extension 18 while returning the link asembly to the retracted position.

It will now be appreciated that this device can be used for various tasks, such as lifting remote objects, turning remote dials, handling hot or dangerous articles, and for such other common tasks as picking up articles from the floor without requiring any bending or inconvenient manipulations.

While various changes may be made in the detail construction, it shall be understood that such changes shall be within the spirit and scope of the present invention as defined by the appended claim.

What I claim as new and desire to protect by Letters Patent of the United States is:

An extendable gripping device comprising, in combination, an extendable link assembly, the hand grip at one end of said link assembly for effecting extension thereof, an article gripping device carried upon the opposite end of said link assembly, cable means normally urging said link assembly toward a retracted position, said extendable link assembly comprising a plurality of pivotally connected links movable in unison between said normally retracted position and said extended position thereof, said hand grip comprising a pair of finger receiving openings formed in one terminal pair of said links of said assembly, said article gripping device comprising an extension at the opposite end of said link assembly having a clamp arm pivotally mounted thereupon for movement between the normally closed position with said extension and an open position for receiving an object therewithin, said clamp arm being pivotally movable in a laterally outward direction in response to a longitudinal movement of said extendable link assembly, said cable means comprising a substantially flexible cable windingly secured at one end upon a sheave rotatably supported upon said one end of said link assembly, the opposite end of said cable being connected to said clamp arm of said gripping device for effecting the opening thereof in response to an extension of said link assembly, and spring means acting between said link assembly and said sheave normally rotating said sheave toward a cable winding position.

References Cited in the file of this patent

UNITED STATES PATENTS

| | | |
|---|---|---|
| 833,485 | Rud | Oct. 16, 1906 |
| 1,337,398 | Fleckner | Apr. 20, 1920 |
| 1,549,836 | Hopp | Aug. 18, 1925 |
| 1,885,183 | Collins | Nov. 1, 1932 |

FOREIGN PATENTS

| | | |
|---|---|---|
| 510,637 | Belgium | Apr. 30, 1952 |
| 176,217 | Great Britain | Mar. 9, 1922 |